Oct. 15, 1929.   C. C. BRAYTON   1,731,609
CONVEYER
Filed Dec. 11, 1922   2 Sheets-Sheet 2

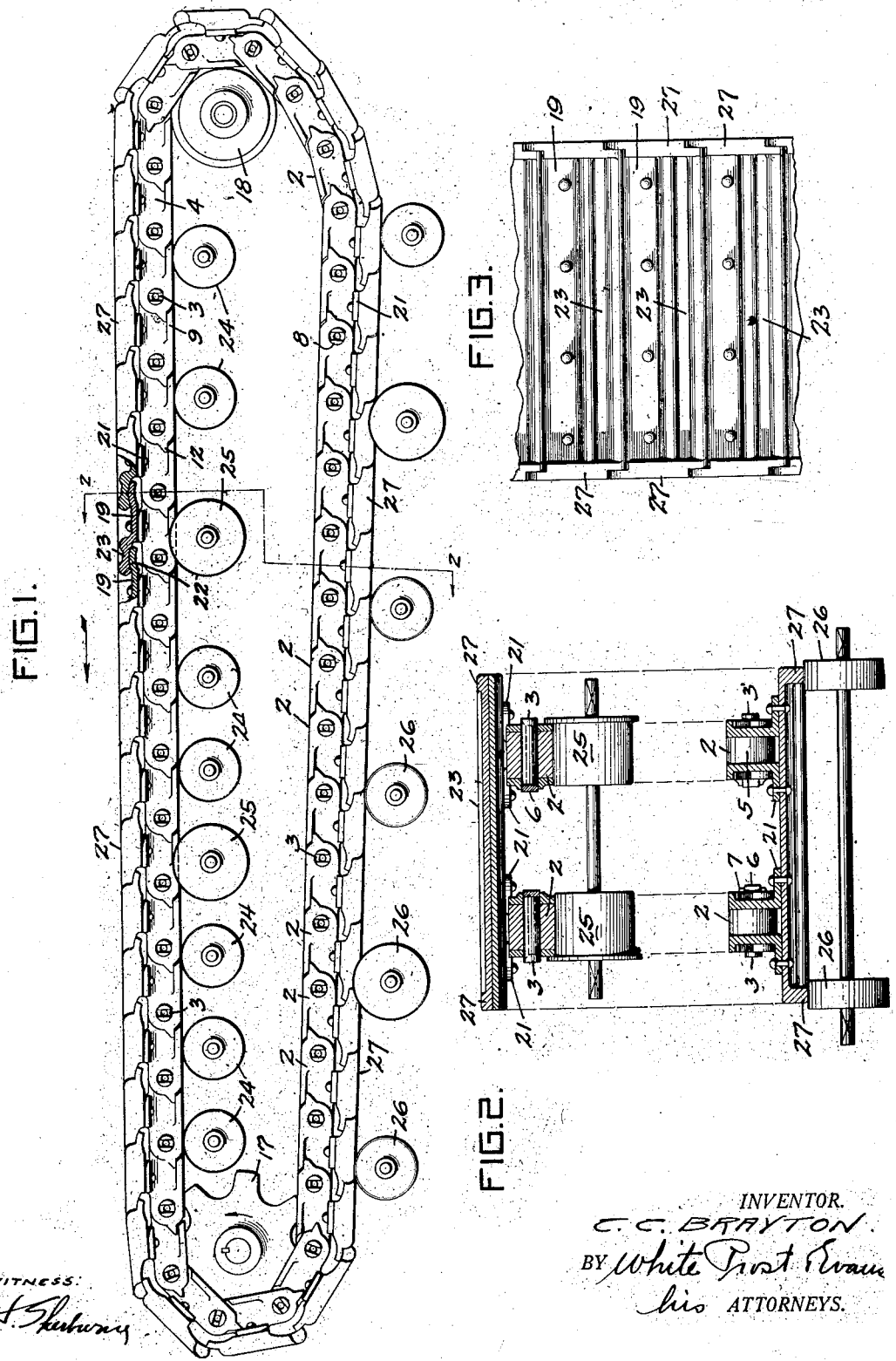

INVENTOR.
C. C. BRAYTON
BY White Prost Evans
his ATTORNEYS.

WITNESS:
H. Sherburne

Patented Oct. 15, 1929

1,731,609

UNITED STATES PATENT OFFICE

COREY C. BRAYTON, OF BERKELEY, CALIFORNIA, ASSIGNOR TO AMERICAN MANGANESE STEEL COMPANY, OF CHICAGO HEIGHTS, ILLINOIS, A CORPORATION OF MAINE

CONVEYER

Application filed December 11, 1922. Serial No. 606,030.

The invention relates to conveyers and particularly to platform conveyers, pan conveyers and apron conveyers or feeders.

Conveyers of this type have generally consisted essentially of shallow pans or plates of heavy metal, mounted on drive chains to form an endless flexible conveyer or apron. The chains have comprised a series of links hinged together, each hinge pin comprising a bushing or axle on which a roller is mounted, there being a series of rollers on each side of the conveyer. The rollers moved bodily with the conveyer and ran on stationary tracks arranged at the sides of the conveyer, both on the upper and lower runs thereof. Each chain link comprised two side bars, an axle or bushing disposed between the side bars and a roller mounted on each bushing. Since two chains are employed in each conveyer, this construction embodied a multiplicity of moving parts, including two travelling rollers for each pan or apron section. These travelling rollers cannot be properly lubricated, so that an extremely large friction load is produced which results in excessive wear of the rollers and bushings, and causes the consumption of a large amount of power to drive the conveyer, even when it is transporting no load. The chain links are also subject to great wear at the hinge joint, so that the conveyer is quickly reduced to a general loose and "shackly" condition.

It is an object of my invention to provide a conveyer in which these deleterious conditions are obviated, in which the wear is reduced to a minimum and which requires a lesser consumption of power for its operation.

A further object of the invention is to provide a conveyer of the class described from which travelling rollers have been eliminated.

Another object of the invention is to provide means for supporting both runs of a rollerless conveyer of this type, to relieve the end shafts of excessive strain.

The invention possesses other advantageous features, some of which, with the foregoing, will be set forth at length in the following description where I shall outline in full, that form of the invention which I have selected for illustration in the drawings accompanying and forming part of the present specification. In said drawings I have shown one form of conveyer embodying my invention, but it is to be understood that I do not limit myself to such form, since the invention, as set forth in the claims may be embodied in a plurality of forms.

Referring to said drawings:—

Figure 1 is a side elevation of an apron feeder embodying my invention, the carrying frame for the supporting rollers being omitted.

Fig. 2 is a section through the feeder taken on the line 2—2 Fig. 1.

Fig. 3 is a plan or top view of a portion of the feeder.

Figure 4:
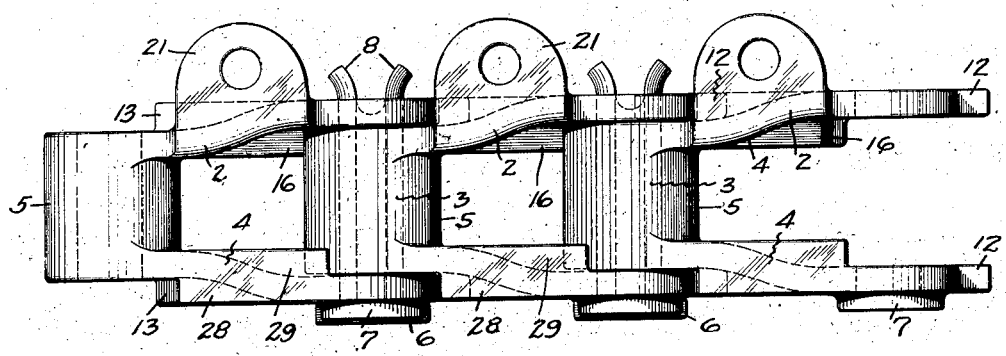
Fig. 4 is a plan view of several connected chain links embodying a modified form of the invention.

The conveyer of my invention comprises one or more chains, each composed of a plurality of hingedly connected one-piece integral links 2, hinged together by the pins 3. The links are constructed so that when hinged together, they form a chain flexible in one direction and rigid in the opposite direction, so that the chains may flex to pass over rollers or sprockets, but will not sag under the load imposed on the conveyer. Each link is an integral casting comprising side walls 4 which are connected together at one end by the integral barrel 5. The walls 4 diverge from each other as they depart from the barrel 5, so that at the other end of the link, the side walls are spaced apart sufficiently to receive the barrel 5 of the next link between them. The side walls are provided adjacent their ends with transverse apertures, which, when the links are assembled, register with the aperture through the member 5 and the pin 3 is passed through the alined apertures, to hinge the links together. The pin is preferably large in diameter, to produce a large bearing surface and is preferably made hollow to reduce its weight. On one end the pin is provided with an elongated head 6 which fits between bosses 7 on one side wall, to prevent rotation of the pin and on its other end is provided with extensions 8, which may be spread apart to prevent accidental unseating of the pin.

Each link is provided on each side, preferably along the lower edge at the narrow portion of the link, with a flange or shoulder 9 which forms a stop for the projection or tooth 12 on the end of the side wall of the adjacent link, the tooth 12 being so disposed that its contact with the flange 9 arrests the relative movement of the links when they are in alinement, thus preventing the chain from sagging. The flange 9 is provided with a curved end 13 which is substantially concentric with the axis of the hinge pin and the end is so disposed that it lies closely adjacent the curved end of the side wall 4 of the adjacent link. The lower surface of the flange forms a continuation of the lower face of the side wall making the lower face of the side wall wider, as at 15, to form a track. Another flange 16 on the inside of the side wall at its lower face further widens the lower face of the side wall and this widened portion extends for the length of the link, except where the links are in overlapping arrangement. The width of the two overlapping portions is equal to the width of the widened portion, so that the under surface of the chain presents two substantially continuous parallel tracks or supporting surfaces.

A conveyer usually comprises two parallel chains which pass over drive sprockets 17 at one end of the run and over idler wheels 18 at the other end of the run. The floor of the conveyer comprises a plurality of overlapping heavy metal floor segments 19, each segment being secured to two transversely alined links in the two chains, the links being usually provided with apertured ears 21 at their upper edges to receive rivets passing through the floor segments. An endless flexible floor is thus provided for transporting the load placed thereon. The floor segments are preferably arranged in overlapping relation, so that as they pass over the sprockets or idlers they will not be spread apart to form cracks between adjacent segments. The segments are further preferably shaped so that no open joint will be formed between them as they pass around the end turns. For this purpose each floor segment is provided on each of its ends with an upwardly curved lip concentric with the axis of the hinge pin. The lip 22 on the rear end of the segment lies under the lip 23 on the front end of the following segment, so that as the conveyer is flexed, the lips may move readily without opening a joint between the successive segments.

Instead of arranging a roller on each hinge pin and providing stationary tracks over which the rollers travel, with all of the attendant disadvantages of such construction, I form the track on the bottoms of the chain links, as I have heretofore described and arrange a series of stationary rollers below the conveyer so that they are engaged by and support the track. The rollers are mounted on stationary or rotatable axles mounted in any suitably constructed frame. The majority of the stationary supporting rollers are plain surfaced rollers 24, the sole function of which is to support the upper or loaded run of the conveyer and in addition to these I prefer to employ several flanged rollers 25, spaced apart a greater distance than the rollers 24, which not only serve to support the loaded run of the conveyer but also act to guide the conveyer and prevent transverse movement thereof.

To relieve the sprocket and idler shafts of excessive strain it is desirable to arrange a series of stationary rollers 26, below the lower run of the conveyer and these rollers may be part plain and part flanged as with the rollers under the upper run of the conveyer. A much lesser number of rollers are required in this construction than is required in constructions as heretofore made, in which rollers were arranged on the chain at each hinge and the stationary rollers may be properly lubricated, whereas lubrication of travelling rollers is practically impossible.

Figure 5:
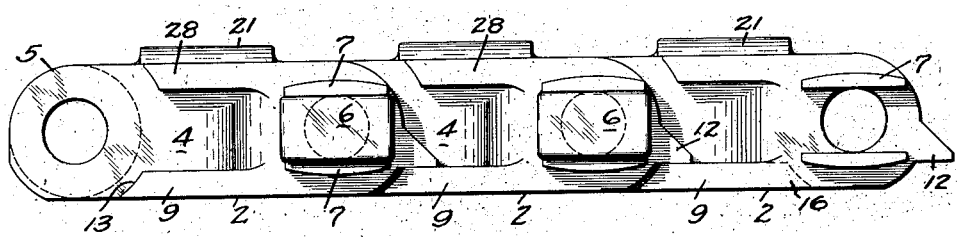
Fig. 5 is a side elevation of the connected chain links shown in Fig. 4.
Figure 6:
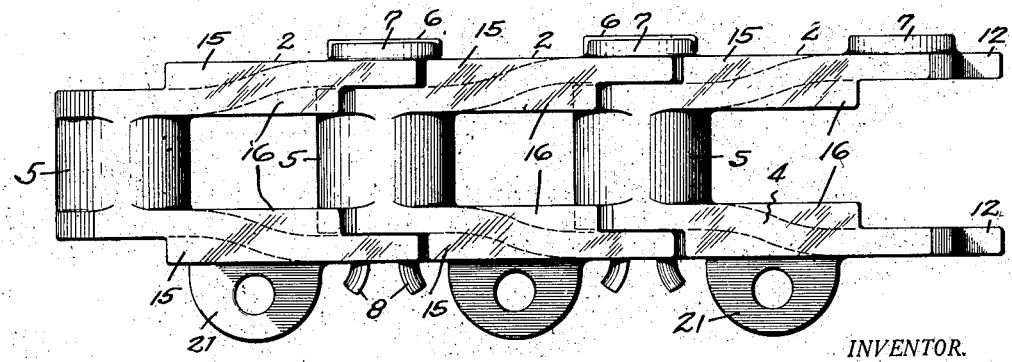
Fig. 6 is an underneath view of the connected chain links.

In order that the conveyer will run smoothly over the lower rollers 26, I arrange track elements on the upper surface of the conveyer to engage these lower rollers. These track elements may be formed on the upper surfaces of the floor segments at their edges or may be formed on the upper surfaces of the chain links. In Figs. 1, 2 and 3, I have shown track elements 27 formed on the floor segments 19, at their edges, there being one track element on each edge of each floor segment. The track sections are cut away on opposite sides of each end, so that the successive elements overlap, forming a continuous track. In Figs. 4 and 5, I have shown track elements formed by thickening one of the side walls of the link on opposite sides, at its diverging portion, by the addition of flanges 28 and 29, which when the links are hinged together, form a substantially continuous track, in substantially the same manner as the track formed on the under surface of the links. When this construction is employed, the ears 21 on the outside of the links are removed and the floor segments are secured to the inner ears only and do not extend outward sufficiently far to overlie the track sections on the outer side walls of the links. This construction presents a smooth track for engagement with the rollers for supporting the lower run of the conveyer.

I claim:—

1. In a conveyer, an endless chain comprising a series of pivotally connected links, each link having two parallel pivotal axes, a flange on each link forming a contact surface, a tooth on each link having a contact surface adapted to engage the flange contact surface of an associated link to prevent undue sagging of the chain, each of said contact surfaces lying parallel to the plane containing the two axes of rotation of the link of which it forms a part.

2. An endless chain comprising a series of pivotally connected links, each link having two parallel pivotal axes, and means on the links unaffected by wear of the pivotal connections including surfaces on said links abutting in a plane parallel to a plane containing two of said pivotal axes for preventing undue sagging of the chain.

3. An endless chain comprising a series of pivotally connected links, each link having two parallel pivotal axes, and means on each link cooperating with means on the associated links including surfaces on said links abutting in a plane parallel to a plane containing two of said pivotal axes for permitting relative motion of said links in directions parallel to the plane containing said axes and preventing undue sagging of the chain.

4. An endless chain comprising a series of pivotally connected links, each link having two parallel pivotal axes, and means on each link meeting means on the associated links in a direction perpendicular to the plane containing the pivotal axes including surfaces on said links abutting in a plane parallel to a plane containing two of said pivotal axes for preventing undue sagging of the chain.

5. A conveyer comprising an endless chain composed of a plurality of links, floor segments secured to the links, track sections on the under side of the links adapted to engage stationary supporting rollers arranged under the upper run of the conveyer and raised track sections on the upper side of the conveyer adapted to engage stationary supporting rollers arranged under the lower run of the conveyer.

6. A conveyer comprising an endless chain composed of a plurality of links, floor segments secured to the links, a track section on the under side of each link for engagement with stationary supporting rollers and raised track sections on the upper side of the conveyer for engagement with other stationary supporting rollers.

7. A conveyer comprising an endless chain composed of a plurality of hingedly connected one-piece links, said links being constructed to permit flexure of the chain in one direction only, a floor segment secured to each link, the successive floor segments being in overlapping relation, a track section on the under side of each link adapted to engage stationary supporting rollers and track sections on the upper side of the conveyer adapted to engage other stationary supporting rollers.

8. A conveyer comprising an endless chain composed of a plurality of hingedly connected links, floor segments secured to said links, track sections formed on the under sides of said links, stationary supporting rollers arranged under the upper run of the conveyer and in engagement with said track sections, raised track sections on the upper side of the conveyer and stationary supporting rollers arranged under the lower run of the conveyer in engagement with said second track sections.

9. A conveyer comprising an endless chain composed of a plurality of hingedly connected one-piece links, a floor segment secured to each link, with the successive segments in overlapping relation, track segments formed on the under side of the links, stationary supporting rollers arranged under the upper run of the conveyer and engaged by said track sections, track sections on the upper side of the conveyer and stationary supporting rollers arranged under the lower run of the conveyer and engaged by said second track sections.

In testimony whereof, I have hereunto set my hand.

COREY C. BRAYTON.